Jan. 28, 1936.  A. COPONY  2,028,826
ENGINE ACCESSORY
Filed Jan. 19, 1933
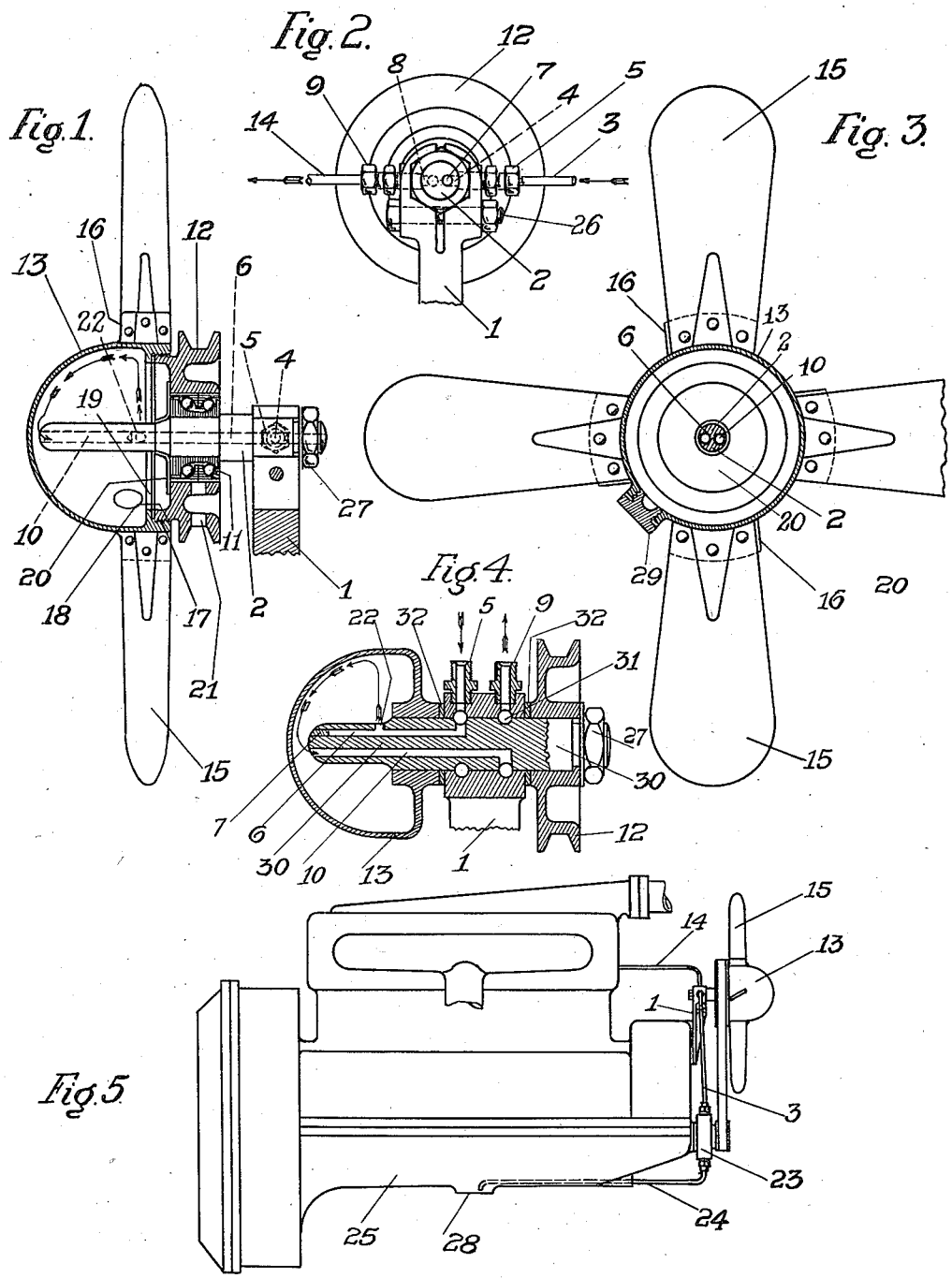
Alfred Copony
Inventor.

Patented Jan. 28, 1936

2,028,826

UNITED STATES PATENT OFFICE 2,028,826

ENGINE ACCESSORY

Alfred Copony, Mount Clemens, Mich.

Application January 19, 1933, Serial No. 652,513

5 Claims. (Cl. 184—6)

My invention relates to a combination of a centrifugal oil cleaning and oil cooling fan that embodies three highly desirable functions in one motor accessory, the fan.

Filters of various types and designs have been used in connection with automobile engines and internal combustion engines of larger type without giving entire satisfaction since none of the filter mediums used can be made of fine enough mesh and structure to extract the objectionable small particles of carbon that accumulate in the oil during use. If the filter cloth is dense enough it is liable to become plugged by the larger carbon particles thereby impeding the passage of smaller carbon particles and oil through the filter cloth and the filter becomes inoperative in a very short time, so that most of the filters confine themselves to the extraction of metal shavings and dirt only. In the centrifugal portion of my invention even microscopically small carbon particles are extracted by centrifugal force from the oil and deposited as a semi-solid sludge on the peripheral inside surface of my centrifuge. This is a very important function since the majority of large carbon particles in oil are an agglomeration of small carbon particles which interlock by their cokelike rough edges into larger flakes in which state they have the tendency to make cold oil semi-fluid at starting, thereby offering resistance to circulation of the oil that might become harmful to a cold engine. Very hot oil which generates on hot summer days on long sustained high speed driving has the tendency to lose a good part of its lubricating qualities by loss of viscosity so that it is important to cool this oil for better engine operation and this also is accomplished by my centrifugal oil separator since it is in the direct air blast generated by the fan of the engine and therefore fills this function admirably.

In the drawing:—

Figure 1 shows a vertical cross section through my fan including a portion of the fan bracket, with the shaft of the fan left whole.

Figure 2 shows a right hand end view of Figure 1 with the oil line connections in place but without the fan blades.

Figure 3 is a left hand view of a cross section of Figure 1 taken in a plane slightly forward of the plane of the leading edges of the fan blades.

Figure 4 is a vertical cross section through another form of my centrifuge, while Figure 5 shows a schematic side view of an engine with my fan attached in position.

My construction shows a fan bracket 1 which can be attached in its lower portion in any desirable manner to an engine. It is split vertically in its upper portion and drawn together by a cross tie bolt 26 Figure 2, so that it forms a snug fit around the smooth offset portion of the fan shaft 2. Fan shaft 2 is equipped with an end nut 27 shown in the right portion of Figure 1 and has a ball bearing 11 mounted by press-fit on an enlarged portion of the shaft which in turn supports a press-fit mounted fan pulley 12. Fan shaft 2 contains two axially parallel bores, one of which is the inlet axial bore 6 extending two thirds of the length of the shaft and connects with an inlet cross bore 4 in the center of the fan bracket bearing which in turn connects with inlet pipe connection 5 and that in turn with oil inlet pipe 3 on the right side of Figure 2. A cross bore forming a discharge nozzle 22 inside the centrifuge permits egress of the incoming oil from inlet axial bore 6 into the centrifuge. Inlet axial bore 6 is plugged at the threaded end of the shaft by a plug 7 shown in Figure 2. Outlet axial bore 10 extends from the inside end of the shaft to the center of the fan bracket 1 where it is connected by an outlet cross bore 8, Figure 2, to outlet pipe connection 9 and therewith to outlet pipe 14. The semi-globular hollow centrifuge body 13 made of heat conducting metal is screwed by means of threads 17 to pulley threads 18 and secured against oil leakage by centrifuge gasket 19, Figure 1. A ball bearing gasket 20 made of leather or other suitable material covers the ball bearing 11 on the side of the centrifuge and is flanged on the inside where it bears against a cone shaped portion of fan shaft 2. It is held in place by the oil pressure when in motion. Fan blades 15 are fastened by means of rivets to fins 16 on the centrifuge. A bar socket 21 in fan pulley 12 provides means for unscrewing centrifuge and pulley when required. For easy access in cleaning a screw plug 29 is provided in the centrifuge wall, Figure 3, which is large enough in its opening to permit a round wire brush to clean the walls when necessary. Another form of my construction is shown in Figure 4 where centrifuge as well as shaft are revolving. In this case circular oil grooves 31 are provided in both, bearing and shaft, to take the oil through the stationary bearing into and from the revolving shaft and oil proof washers 32 are used to keep the oil from leaking out.

In operation oil line 3, Figure 5, leading from the pump 23 to inlet pipe connection 5, Figure 2, will conduct oil from the pump 23, Figure 5, to inlet axial bore 6 and from there it will be sprayed against the rotating wall of centrifuge 13, through discharge nozzle 22. As the fan is rotating, driven by the fan pulley 12 the incoming oil will be subjected to the action of centrifugal force and the carbon particles, dirt, grit and chips of metal will separate out and become embedded in the solid sludge forming on the centrifuge wall. As soon as the centrifuge is filled with oil, the pressure exerted by the pump will have a tendency to force the oil near the tip of the centrifuge into outlet bore 10 of shaft 2 from where it then will return to outlet pipe 14 and be conducted to the bearings to be oiled, afterwards collecting in the sump 28 of the engine 25, Fig. 5, from which it will be taken by suction line 24 of the pump 23 in order to repeat the cycle. Due to the fact that air is forced through the radiator by the fan blades 15, the stream of radiator-warmed air will strike the tip of centrifuge 13 where it will be diverted over the whole hot surface of the centrifuge thereby acting as cooling agent for the oil and sludge inside the centrifuge. This method functions efficiently since the tip of the centrifuge facing the radiator is struck by the coolest portion of the air, while the large diameter of the centrifuge which is cooled less effectively by the heated air is struck by the hot oil coming from the discharge nozzle so that temperature differences in all portions of the centrifuge will be effectively used.

My construction lends itself to a variety of modifications without departing from the spirit of my invention.

I can change the form of my centrifuge provided the construction of the automobile permits the use of a more oblong parabolic form of centrifuge, thereby decreasing the wind resistance (streamlining). I may further provide an opening in the radiator commensurate to the cross section of my centrifuge thereby permitting the drawing in of air of normal temperature to more efficiently cool the surface of the centrifuge without departing from the spirit of my invention. In the operation of my centrifuge I am not limited to the fan shaft for the application of my device, as any fast moving shaft of the engine will act within certain limits just as well and efficiently.

Having thus described my invention, what I claim as my own, is:—

1. In a centrifuge for the purification of oil in internal combustion engines, the combination of a rotating shell actuated by said engine, means on the outside periphery of said shell to create a current of air over the surface of said shell when said engine is in operation, means for admission of polluted oil of said engine into said shell, and means to extract the purified oil from said shell.

2. In a centrifuge for the purification of oil in internal combustion engines, the combination of a rotating shell actuated by said engine, means on the outside periphery of said shell to create a current of air over the surface of said shell when said engine is in operation, means in said shell to extract the sludge deposit formed by said cleaning operation when the engine is at rest, means for admission of polluted oil into said shell, and means for extracting the purified oil from said shell when said engine is in operation.

3. In a centrifuge for the purification and cooling of oil, the combination of a rotatable shell, a shaft for said shell, means in said shaft for the admission of polluted and discharge of cleaned oil, and a fan mounted on said centrifuge adapted to draw air through the normal radiator of a motor and over the surface of said rotatable shell.

4. In a system for the purification and cooling of oil, the combination of a fan normally adapted to draw air through the radiator of a motor vehicle, and a hub on said fan adapted to the cleaning of oil by centrifugal action and the cooling of said oil by the air current created by said fan.

5. In a system for the purification and cooling of oil, the combination of a fan normally adapted to draw air through the radiator of a motor vehicle, a hub on said fan adapted to the cleaning and cooling of oil by centrifugal action and the air current created by said fan over said hub, and a plugged opening in the periphery of said hub to remove the dirt accumulated in said hub of said fan when said fan is at rest.

ALFRED COPONY.